(12) United States Patent
Banko et al.

(10) Patent No.: US 7,532,149 B2
(45) Date of Patent: May 12, 2009

(54) REARVIEW MIRROR ASSEMBLY ENCOMPASSING A RADAR DETECTOR AND/OR LASER DETECTOR

(75) Inventors: Sarah V. Banko, Palo Alto, CA (US); Joshua D. Banko, Palo Alto, CA (US)

(73) Assignee: Banko Industries, Palo Alto, CA (US)

( * ) Notice: Subject to any disclaimer, the term of this patent is extended or adjusted under 35 U.S.C. 154(b) by 0 days.

(21) Appl. No.: 11/867,599

(22) Filed: Oct. 4, 2007

(65) Prior Publication Data

US 2009/0091489 A1     Apr. 9, 2009

(51) Int. Cl.
    *G01S 7/42*    (2006.01)
    *B60R 1/12*    (2006.01)

(52) U.S. Cl. .......................................... 342/20; 362/494
(58) Field of Classification Search ................. 342/20; 362/494
    See application file for complete search history.

(56) References Cited

U.S. PATENT DOCUMENTS

| | | | | |
|---|---|---|---|---|
| 4,625,210 A | * | 11/1986 | Sagl | 342/20 |
| 4,630,904 A | * | 12/1986 | Pastore | 359/636 |
| 4,906,999 A | * | 3/1990 | Harrah et al. | 342/20 |
| 5,151,701 A | * | 9/1992 | Valentine et al. | 342/20 |
| 5,206,651 A | * | 4/1993 | Valentine et al. | 342/20 |
| 5,667,176 A | * | 9/1997 | Zamarripa et al. | 248/231.51 |
| 5,684,488 A | * | 11/1997 | Liautaud et al. | 342/20 |
| 6,614,579 B2 | * | 9/2003 | Roberts et al. | 359/267 |
| 2006/0012509 A1 | * | 1/2006 | Bartosik et al. | 342/20 |

* cited by examiner

*Primary Examiner*—Ian J Lobo
(74) *Attorney, Agent, or Firm*—Wheelock Chan LLP; Thomas Chan

(57) ABSTRACT

One embodiment of a rearview mirror encompassing a plurality of radar detectors and laser detectors comprises of an opaque housing, a rearview mirror assembly, a universal mount, and a PCB assembly providing all of the illumination, audible indication, logic, user inputs, and radar and laser detection. Visual indications of radar or laser signals via illuminated indicators visible through the mirror, provide a fully functioning rearview mirror, when in standby mode. The device accommodates a plurality of mounts in order to accommodate all vehicle types. The geometry and mounting locations provide for more sensitive and accurate detection of radar and laser signals, while neither distracting the drive, detracting from the aesthetic nature of the vehicle, or causing a safety hazard.

16 Claims, 15 Drawing Sheets

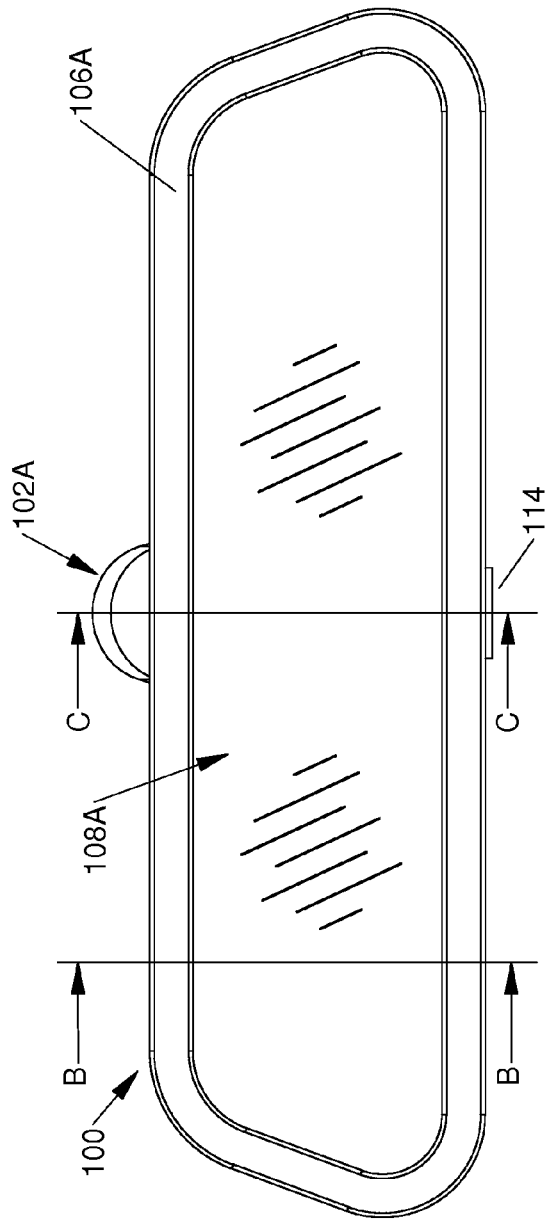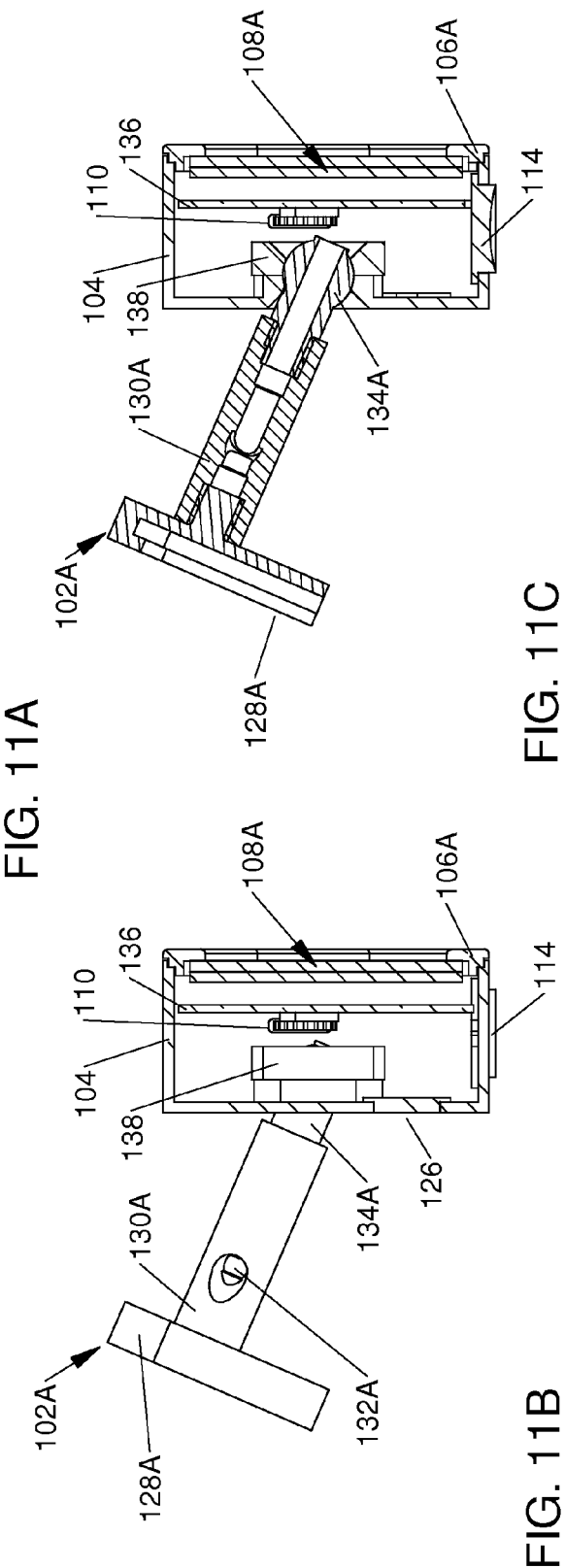
FIG. 11A
FIG. 11B
FIG. 11C

REARVIEW MIRROR ASSEMBLY ENCOMPASSING A RADAR DETECTOR AND/OR LASER DETECTOR

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field of Invention

This invention generally relates to a rearview mirror assembly, specifically to a rearview mirror assembly for use in vehicles and incorporating functions of a radar detector and/or laser detector.

2. Prior Art

Radar detectors for vehicles have been in common use for many years as they provide a desired function for the vehicle driving public. There are several factors that make the use of radar detectors unpleasant for the consumer and prevent its more widespread use.

Radar detectors are typically after-market purchases and are installed as home using a variety of simple included mounts. When using these included mounts, consumers are given instructions as to where to mount the device in order to experience the greatest performance from the device. An ideal position is in the center of the vehicle, close to the windshield glass, and as high as possible without being in the line of sight of the tinted band typically found at the top of most windshields.

One of the most common mounts utilizes a plurality of suction cups attached to a mounting bracket by which the radar detector is suspended from the windshield of the vehicle. The other involves attaching the device to a bracket that clips to a sun visor mounted to the ceiling of the vehicle. Under these constraints, the best possible location is in the location typically occupied by the rearview mirror. Since that location is not available, the next options available, given the included mounts, are either attached to the windshield directly below the rearview mirror or attached to the right side of the driver's sun visor.

The Suction Cup Mount

Using suction cups presents difficulty because the suction cups can become loose and have to be readjusted. They also rely on the windshield being clean and dry however, dirt and oils are introduced each time the mount is reattached, further reducing its ability to adhere securely to the windshield. Loose suction cups can lead to driver distraction and pose a safety hazard when the device falls off of the windshield while the vehicle is traveling. These mounts are accompanied by a spiral power cable that dangles downward from the device where it can be plugged into a power outlet such as a cigarette-lighter outlet. As most vehicles only have one such outlet, using it for a radar detector prevents it from being used for powering additional devices such as a mobile phone, portable music player, etc. Mounting a radar detector to the windshield with a cable dangling can be distracting to the driver and can obstruct his or her view of the road ahead. This cable also inhibits the use of other controls on the vehicle console such as thermostat, audio, and navigation controls. Windshield mounts also make the radar detector visible from outside the vehicle, encouraging break-in and theft.

In the case of older vehicles, specifically the American muscle cars of the 1960s and 1970s, the suction cups are an inadequate mount because of the steep angle at which windshields on those vehicles are mounted. Most suction cup based mounting brackets hold the radar detector at a predetermined angle with respect to the windshield. While this is suitable for the majority of vehicles, in a muscle car this mounts the radar detector at an angle such that the radar detector receiver will be pointed downward and not allow for maximum sensitivity of the device. Depending on the geometry of the radar detector enclosure, many angularly adjustable mounts are not able to support the load of the device because it creates a great moment arm about the mounted suction cups, causing the radar detector to be unstable and fall off the windshield. This can be especially distracting and potentially hazardous to the driver and passengers of the vehicle.

The Visor Clip Mount

The second mounting mentioned, including a sun visor clip, prohibits the use of the sun visor for its original intention, thus creating a safety hazard in bright sunlight. The sun visor clip method also frequently has inadequate connection between the clip and the device, causing the device to fall off of the sun visor and into the face or lap of the driver, creating an additional safety hazard.

In the aforementioned case of a muscle car, the sun visor mounting clips frequently cause two problems. First, these clips are designed to accommodate the modern sun visor that is much thicker than older models and the clip does not attach securely to the sun visor of a muscle car. Second, the friction about the hinge where the sun visor pivots is greater in modern vehicles than in muscle cars, in order to accommodate the greater weight in these modern visors. In most cases, the hinge on the sun visor of a muscle car cannot support the additional load of the radar detector's weight. U.S. Pat. No. 5,667,176 to Zamarripa (1997), mentions several additional difficulties with both the suction cup and sun visor clip mounting methods.

The design of U.S. Pat. No. 5,667,176 to Zamarripa (1997) fails to account for the awkward and potentially hazardous power cable or the security risks with a device that is visible from outside the vehicle. In this design, only the standard power option of a spiral cable is available. Thus, the problems of the obtrusive cable dangling down to a cigarette-lighter power outlet still remain. This design is also very large, in order to accommodate a wide variety of radar detector enclosures and creates a blind spot for the driver in the center of the windshield where this mount attaches to the rearview mirror.

U.S. Pat. No. 4,630,904 to Pastore (1986) discloses a rearview mirror assembly comprising of a two-way mirror with information display designed to maximize reflective surface when information is not displayed; however, a two-way mirror does not provide optimal image reflectance, reducing the effectiveness of the rearview mirror assembly's primary function. More specifically, because both sides of the two-way mirror have variable lighting conditions for instance, daytime versus nighttime on the exposed side and Light Emitting Diode (LED) illumination versus non-illumination on the interior, the reflectance of the mirror varies greatly and cannot be relied upon for the primary function.

U.S. Pat. No. 6,614,579 to Roberts et al. (2003) discloses a rearview mirror assembly comprising of a transparent housing and a radar laser detector where either the housing or rearward viewing means is at least partially transparent to wavelengths of light to which said laser radar detector is sensitive. The biggest limitation of this design is that the transparency is only sensitive to wavelengths of light and not radar waves, preventing the device from detecting radar signals.

Thus, a need exists for a radar detector and laser detector mount that overcomes the previously mentioned problems in the prior art without introducing any new problems.

SUMMARY

In accordance with one embodiment, a rearview mirror assembly contains within it a radar detector and a laser detector. Visual and audible indicators are present only when the device is in an active state. An active state is defined as when the internal radar detector or laser detector have detected a radar signal or a laser signal. While in standby mode, when the device is powered but no signals are detected, with the power indicator dimmed, the device provides no indication that any special features are available and appears just as a normal rearview mirror.

DRAWINGS

Figures

In the drawings, closely related figures have the same number but different alphabetic suffixes.

FIG. 11A shows a front view of a rear view mirror assembly with a glass mount and location of section lines B-B and C-C, in accordance with a first embodiment.

FIG. 11B shows a cross sectional view at line B-B from FIG. 11A, in accordance with a first embodiment.

FIG. 11C shows a cross sectional view at line C-C from FIG. 11A, in accordance with a first embodiment.

FIG. 13 shows an exploded view of the ceiling mount, in accordance with the fifth embodiment.

DRAWING

Reference Numerals

| | |
|---|---|
| 100 | Rearview mirror assembly |
| 102A | Windshield mount assembly |
| 102B | Ceiling mount assembly |
| 104 | Housing |
| 106A | Bezel |
| 106B | Wide bezel |
| 108A | Mirror glass assembly, standby mode |
| 108A' | Mirror glass assembly when all indicators are illuminated |
| 108B | Mirror glass assembly, standby mode |
| 108B' | Mirror glass assembly with all indicators are illuminated |
| 108C | Mirror glass assembly, standby mode |
| 108C' | Mirror glass assembly, with all indicators illuminated |
| 108D | Mirror glass assembly |
| 110 | Multi-function roller/push button |
| 112A | Power indicator |
| 112B | Power indicator |
| 112C | Power indicator |
| 112D | Power indicator |
| 114 | Multi-function push button |
| 116A | Directional arrows illuminated |
| 116B | Directional arrows illuminated |
| 116C | Directional arrows |
| 116C' | Directional arrows illuminated |
| 116D | Directional arrows |
| 116D' | Directional arrows illuminated |
| 118A | Signal type indicator illuminated |
| 118B | Signal type indicator illuminated |
| 118C | Signal type indicator |
| 118C' | Signal type indicator illuminated |
| 118D | Signal type indicator |
| 118D' | Signal type indicator illuminated |
| 120A | Intensity indicator illuminated |
| 120B | Intensity indicator illuminated |
| 120C | Intensity indicator |
| 120C' | Intensity indicator illuminated |
| 120D | Intensity indicator |
| 122 | Speaker opening |
| 124 | Aperture for radar receiver |
| 126 | Aperture for laser receiver |
| 128A | Windshield mount bracket |
| 128B | Ceiling mount bracket |
| 130A | Windshield mount shaft |
| 130B | Ceiling mount shaft |
| 132A | Cable exit in windshield mount shaft |
| 132B | Cable exit in ceiling mount shaft |
| 134A | Windshield mount spherical joint |

-continued

| 134B | Ceiling mount spherical joint |
| 136 | PCB assembly |
| 138 | Spherical joint bushing |
| 140 | Ceiling mount shaft endcap |

DETAILED DESCRIPTION

First Embodiment—FIGS. 1-4 and 11-12

Figure 1:
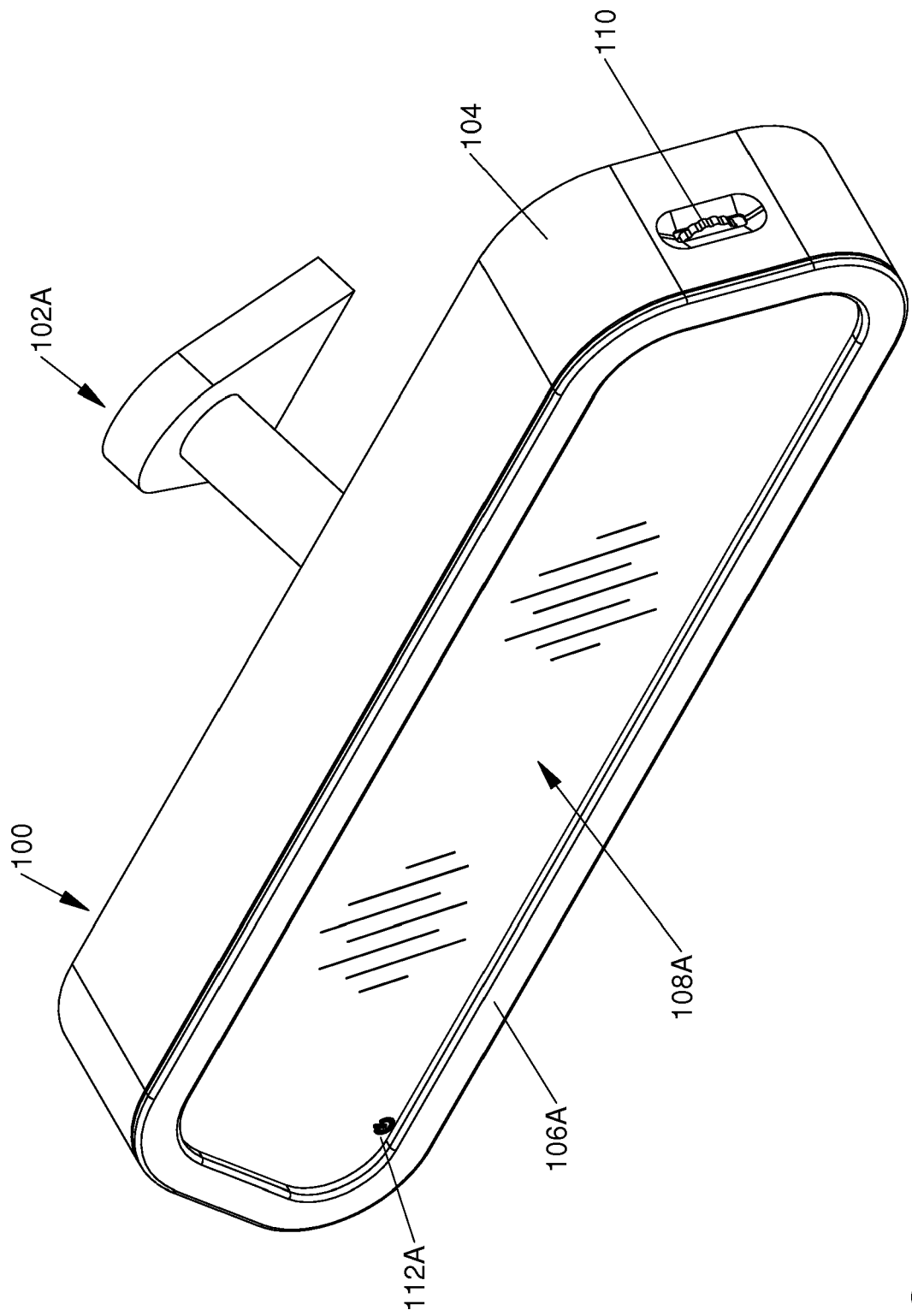
FIG. 1 shows a front perspective view of a rearview mirror assembly in standby mode, in which the device is powered but no radar or laser signal is detected, in accordance with the first embodiment.
Figure 2:
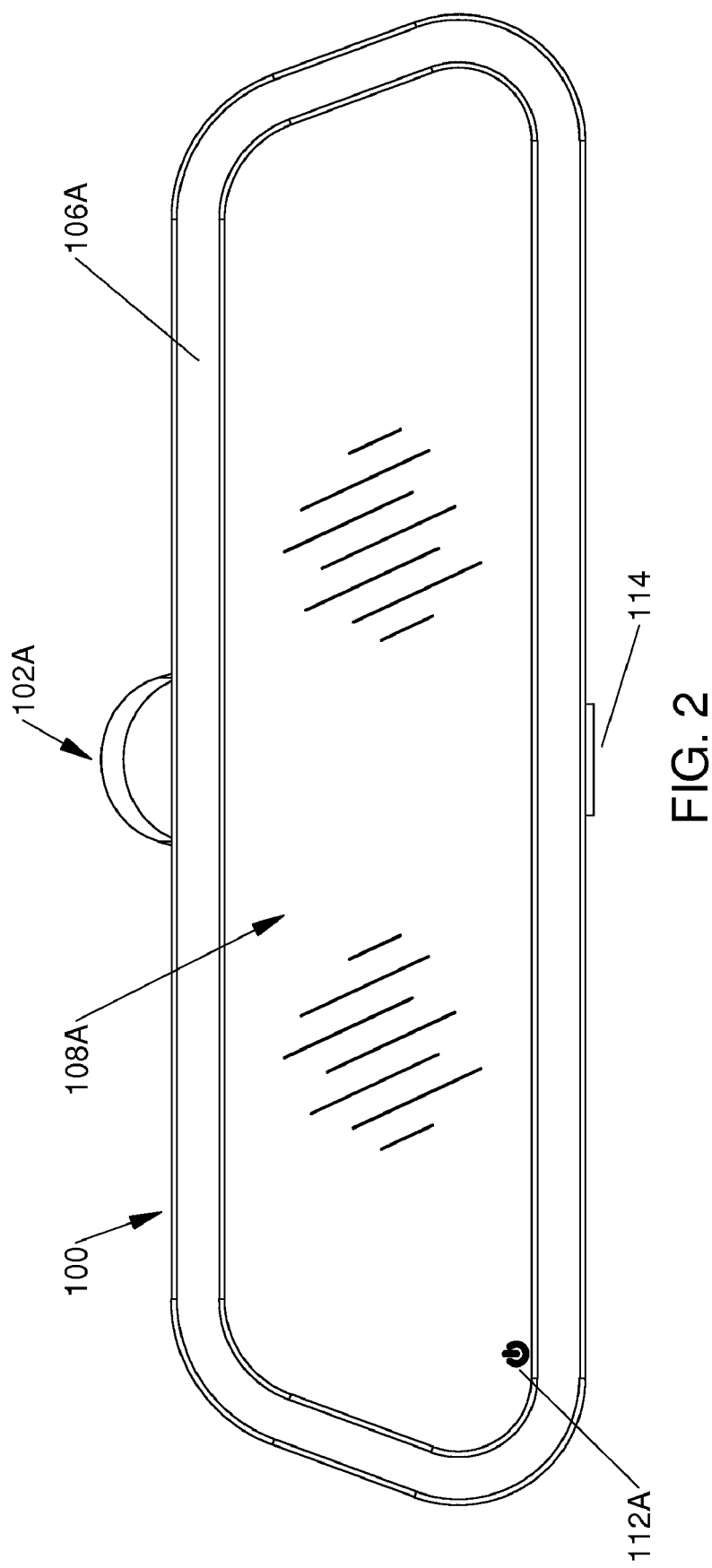
FIG. 2 shows a front view of the rearview mirror assembly in standby mode, in accordance with the first embodiment.
Figure 3:
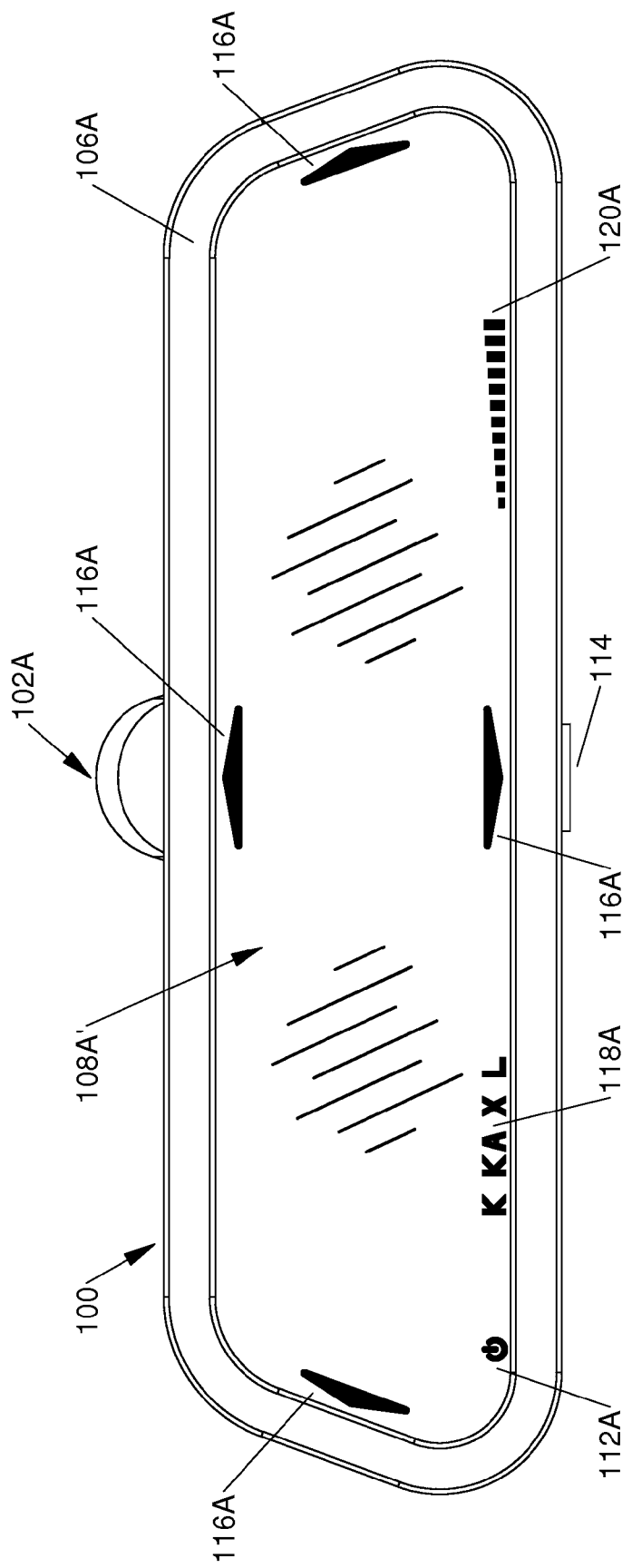
FIG. 3 shows a front view of the rearview mirror assembly with various indicators, behind the mirrored glass, illuminated by LEDs, in accordance with the first embodiment.
Figure 4:
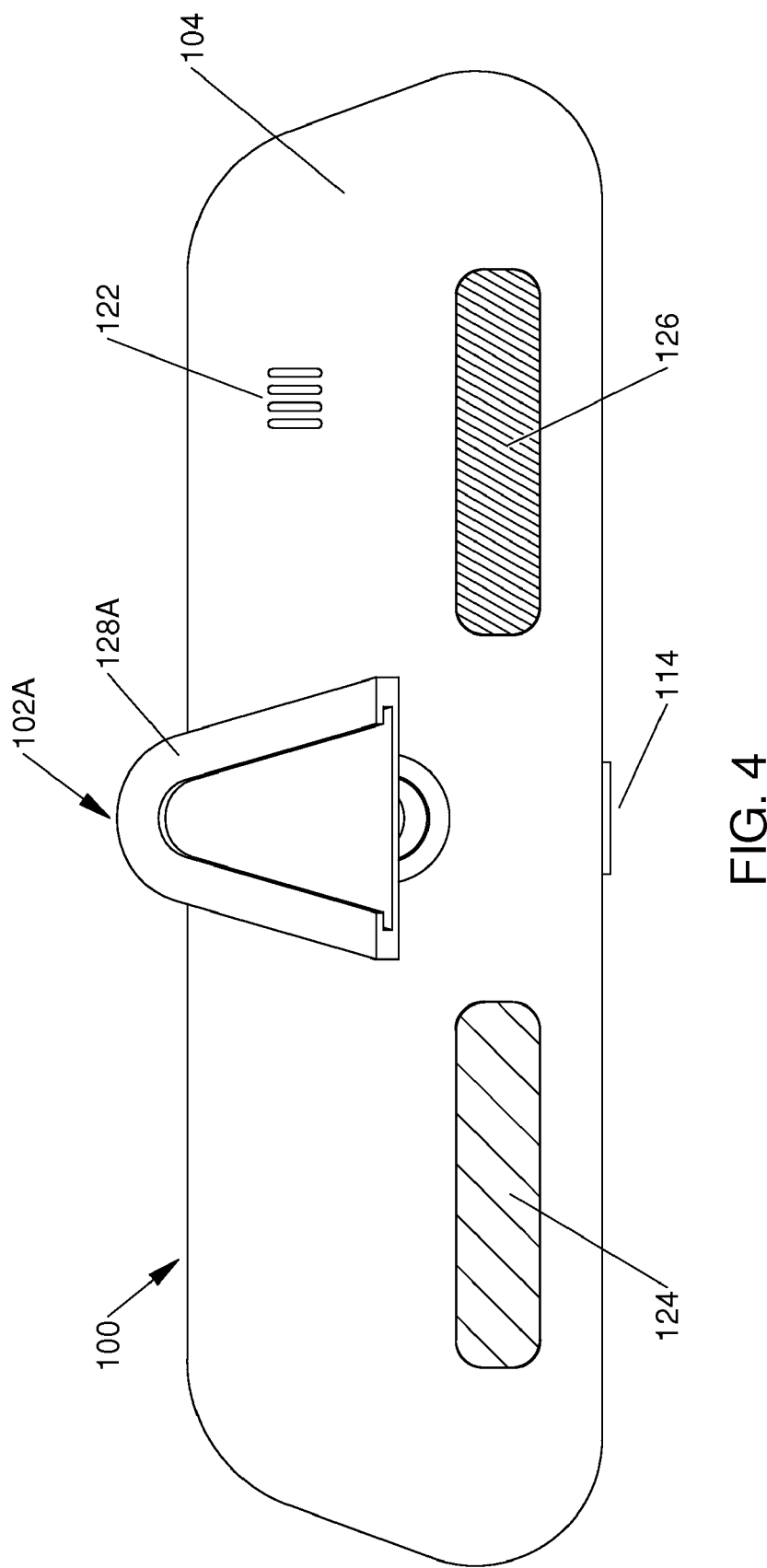
FIG. 4 shows a rear view of a rearview mirror assembly, in accordance with the first embodiment.

One embodiment of the rearview mirror assembly is illustrated in FIG. 1 (front perspective view), FIG. 2 (front view in standby mode), FIG. 3 (front view with illuminated indicators), and FIG. 4 (rear view).

FIG. 1 shows a front perspective view of rearview mirror assembly 100, and windshield mount assembly 102A that enables rearview mirror assembly 100 to attach to a vehicle windshield. The mirror assembly 100 consists of a housing 104 and a bezel 106A, which supports mirror glass assembly 108A. Mirror assembly 100 accommodates multi-function roller/push button 110 and multi-function push button 114 (shown in FIG. 2). Internal to mirror assembly 100 is a PCB assembly 136 which contains controlling electronics for the detection and notification of radar and laser signals. Functions provided by the PCB assembly 136 include but are not limited to illumination of indicators via LEDs, audible notification via speaker, user inputs. Multi-function roller/push button 110 has multiple input methods. It is able to be pressed-in momentarily to select an option or to be pressed and held-in to navigate options or menus. Additionally, a user can slide their finger up or down along the rotating portion of the button in order to increase or decrease relative levels or to scroll through a list of items or settings.

Housing 104 has an internal hemispherical recess that mates to the window mount assembly 102A, described in more detail with FIG. 11C. I currently envision the mirror glass assembly 108A affixing to the housing 104 via screws. It could also be affixed with pressure sensitive adhesive, mechanical snaps, plastic posts from housing 104 that can be melted by ultrasonic welding or by the application of heat from a heat-staking process. Bezel 106A contains features which engage into housing 104 which ensures mirror glass assembly 108A cannot be removed during normal use. Besides mechanical features, bezel 106A and housing 104 may be fastened together via custom screws installed with special driver, to ensure the device against tampering. Other methods of securing the device include liquid adhesive, mechanical snaps, or ultrasonic welding. I presently contemplate that the housing and bezel be made of Thermoplastic polymers that are opaque. They may also be made of Thermoset polymers, metals such s Aluminum, Magnesium, Steel, etc. or composite materials of Carbon or other suitable fibers.

FIG. 2 shows a front view of the first embodiment of mirror assembly 100. With the device in standby mode, the front view of the rearview mirror assembly 108A appears as a conventional rearview mirror without any additional features. In standby mode, the device is powered, as indicated by the illumination of power indicator 112A which can be dimmed via settings. All other indicators are hidden from view in this state.

FIG. 3 shows a front view of the first embodiment of rearview mirror assembly 100 where the following indicators are illuminated: directional indicators 116A, signal type indicator 118A, and intensity indicator 120A. Indicators can be illuminated by user input of multi-function buttons, by detection of radar or laser signals, or by the powering on of the device.

FIG. 4 shows a rear view of mirror assembly 100. Housing 104 incorporates a user input method of multi-function push button 114. Additionally, aperture for laser receiver 126 and aperture for radar receiver 124 are embedded within housing 104. I currently envision that aperture for laser receiver 126 and aperture for radar receiver 124 will be heat-staked into the housing 104. Additional fastening methods include pressure sensitive adhesive, liquid adhesive, mechanical snaps, etc. Speaker opening 122 shows one placement option for output of the speaker which is part of the PCB assembly 136 (FIG. 11B). Other placements can be made to improve sound or to optimize the locations of aperture for laser receiver 126 and aperture for radar receiver 124. The windshield mount assembly 102A is shown in a rear view as seen through the front of the windshield. Windshield mount assembly 102A is placed in a location with respect to housing 104 which does not obstruct aperture for radar receiver 124 and aperture for laser receiver 126 during orientation changes of rear view mirror assembly 100. Instead of having pluralities of apertures dedicated to each type of receiver, a singular aperture may be used to accommodate for multiple receivers of various types. Additionally, pluralities of receivers can be placed in various orientations on any face of the device with any number of corresponding apertures.

FIG. 11A consists of rearview mirror assembly 100 with section lines B-B and C-C, defining the section views shown in FIGS. 11B and 11C.

FIG. 11B is a section view line B-B, as defined by FIG. 11A. It shows the assembled state of windshield mount assembly 102A which includes windshield mount bracket 128A, windshield mount shaft 130A, cable exit 132A, and windshield mount spherical joint 134A. Cable exit aperture 132A allows for cables exiting rearview mirror assembly 100 from being pinched during orientation changes or adjustments made by user. The location of cable exit 132A allows for concealment of power cable where the windshield meets the ceiling of the vehicle, preventing the cable from dangling and distracting the driver of the vehicle. Windshield mount assembly 102A attaches to housing 104 and is fastened by spherical joint bushing 138 via screws in the present embodiment. Ultrasonic welding, heat-staking, or mechanical snaps are also possible methods to retain windshield mount assembly 102A into housing 104. Also shown in FIG. 11B are aperture for laser receiver 126, multi-function roller/push button 110, PCB assembly 136, multi-function push button 114, mirror glass assembly 108A, and bezel 106A.

FIG. 11C is a section view line C-C, as defined by FIG. 11A. It shows the assembled state of windshield mount assembly 102A which includes windshield mount bracket 128A, windshield mount shaft 130A, and windshield mount spherical joint 134A. Windshield mount bracket 128A is fastened via threads into windshield mount shaft 130A. Additional methods for attachment include welding, liquid adhesive, press-fitting, etc. Windshield mount shaft 130A may be fastened to windshield mount spherical joint 134A via threads. Additional fastening methods may include welding, liquid adhesive, press-fitting, etc. Windshield mount assembly 102A attaches to housing 104 and is fastened by spherical joint bushing 138 via screws in the present embodiment. Ultrasonic welding, heat-staking, or mechanical snaps are also possible methods to retain windshield mount assembly 102A into housing 104. Also shown in FIG. 11C are multifunction roller/push button 110, PCB assembly 136, multi-function push button 114, mirror glass assembly 108A, and bezel 106A.

Figure 12:
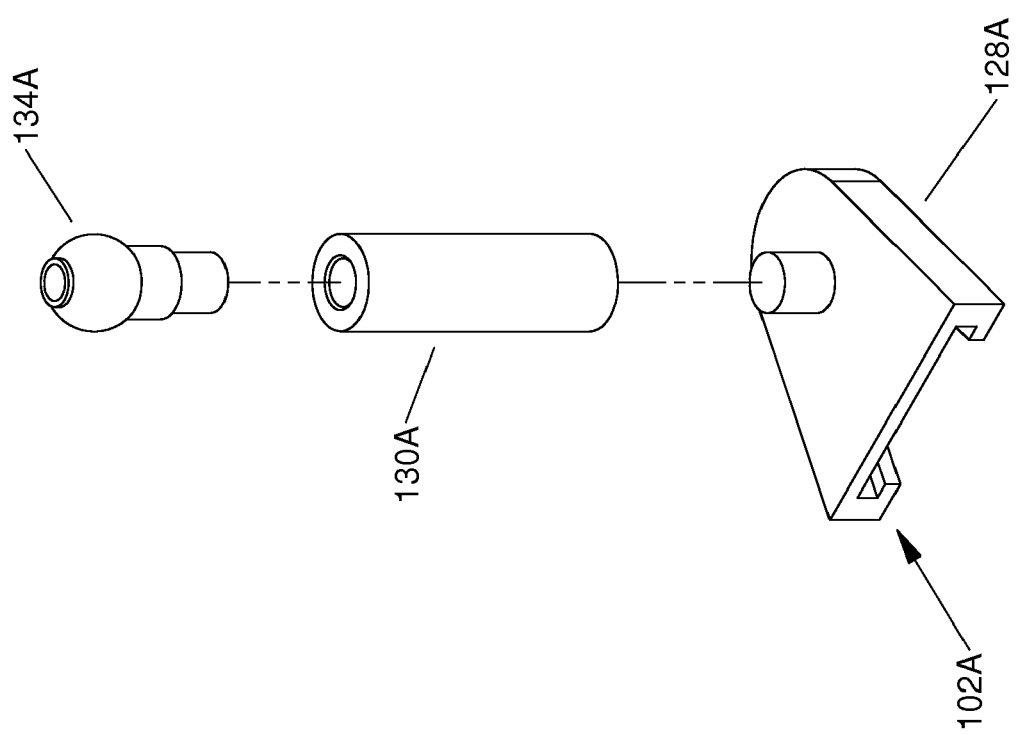
FIG. 12 shows an exploded view of the windshield mount assembly, in accordance with the first embodiment.

FIG. 12 shows an exploded view of windshield mount assembly 102A which includes windshield mount bracket 128A, windshield mount shaft 130A, cable exit 132A, and windshield mount spherical joint 134A.

Figure 5:
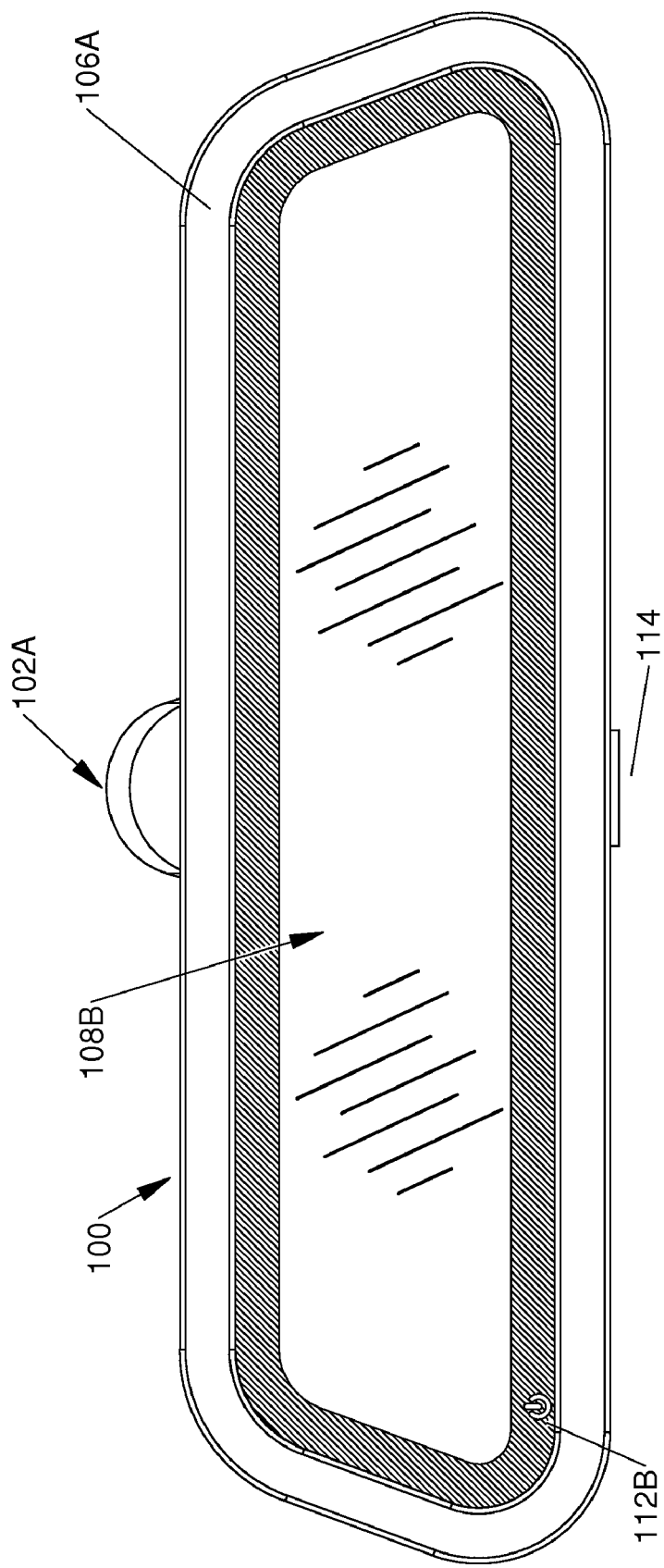
FIG. 5 shows a front view of a rearview mirror assembly in standby mode with a masked out portion around the perimeter of the glass, in accordance with the second embodiment.
Figure 6:
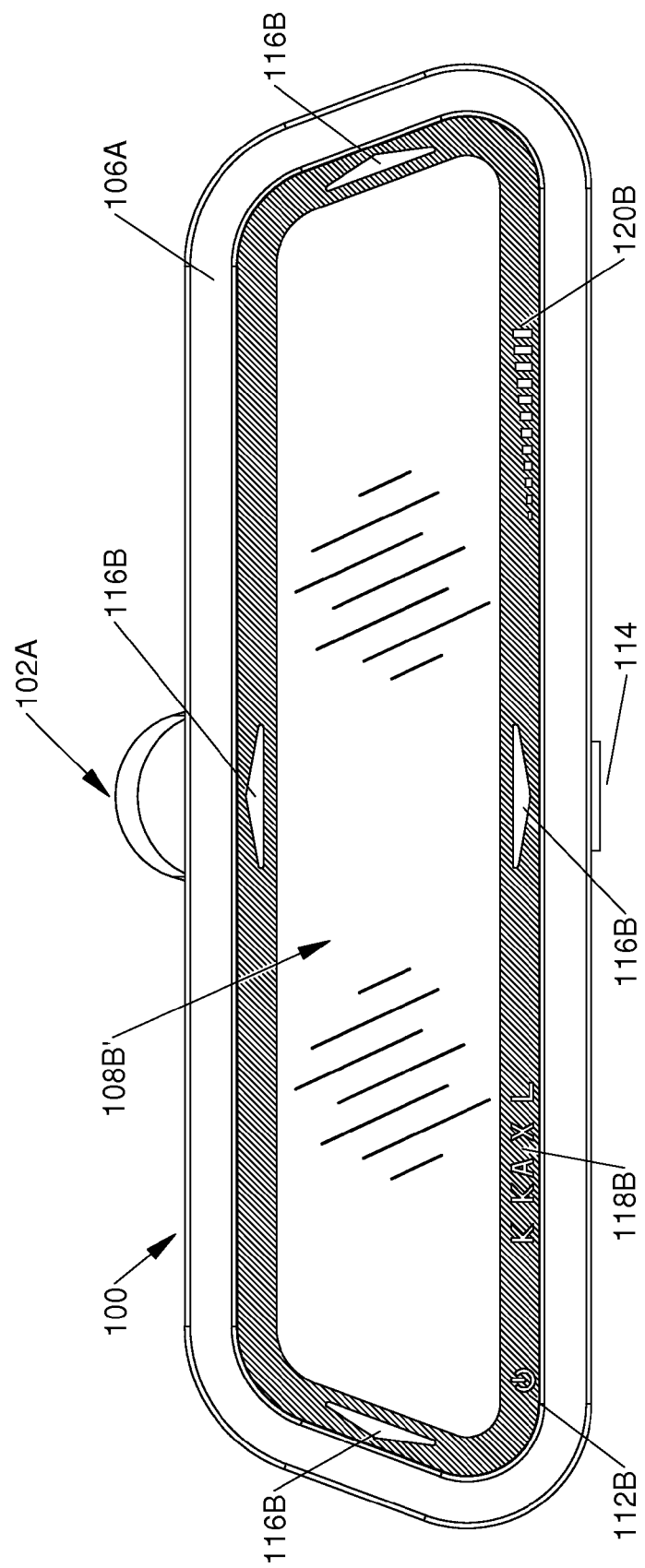
FIG. 6 shows a front view of a rearview mirror assembly with a masked out portion around the perimeter of the glass with various indicators illuminated by LEDs through the masked out portion, in accordance with the second embodiment.

FIGS. 5-6—Second Embodiment

The second embodiment is differentiated by the masked perimeter of the mirror glass assembly 108A.

FIG. 5 consists of rear view mirror assembly 100 in standby mode and shows the presence of windshield mount assembly 102A, bezel 106A, multi-function push button 114, and mirror glass assembly 108A. Power indicator 112B is illuminated to indicate power to the device and standby mode.

FIG. 6 consists of rear view mirror assembly 100 with all available indicators illuminated. One example when this occurs is during the startup sequence after the device has been powered. Also shown are windshield mount assembly 102A, bezel 106A, multi-function push button 114, and mirror glass assembly 108B'. Illuminated indicators include power indicator 112B, directional indicators 116B, signal type indicator 118B, and intensity indicator 120B are visible in mirror glass assembly 108B'.

Figure 7:
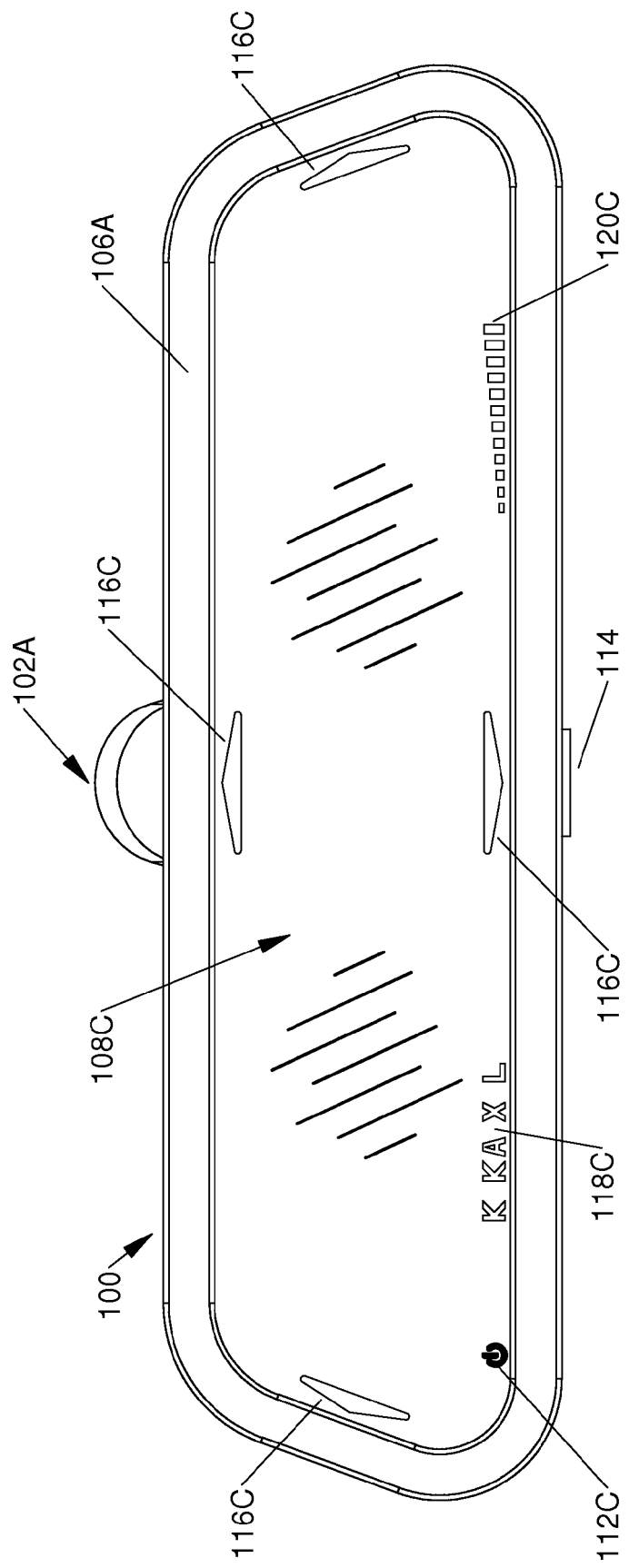
FIG. 7 shows a front view of a rearview mirror assembly in standby mode, with various etched indicators, in accordance with the third embodiment.
Figure 8:
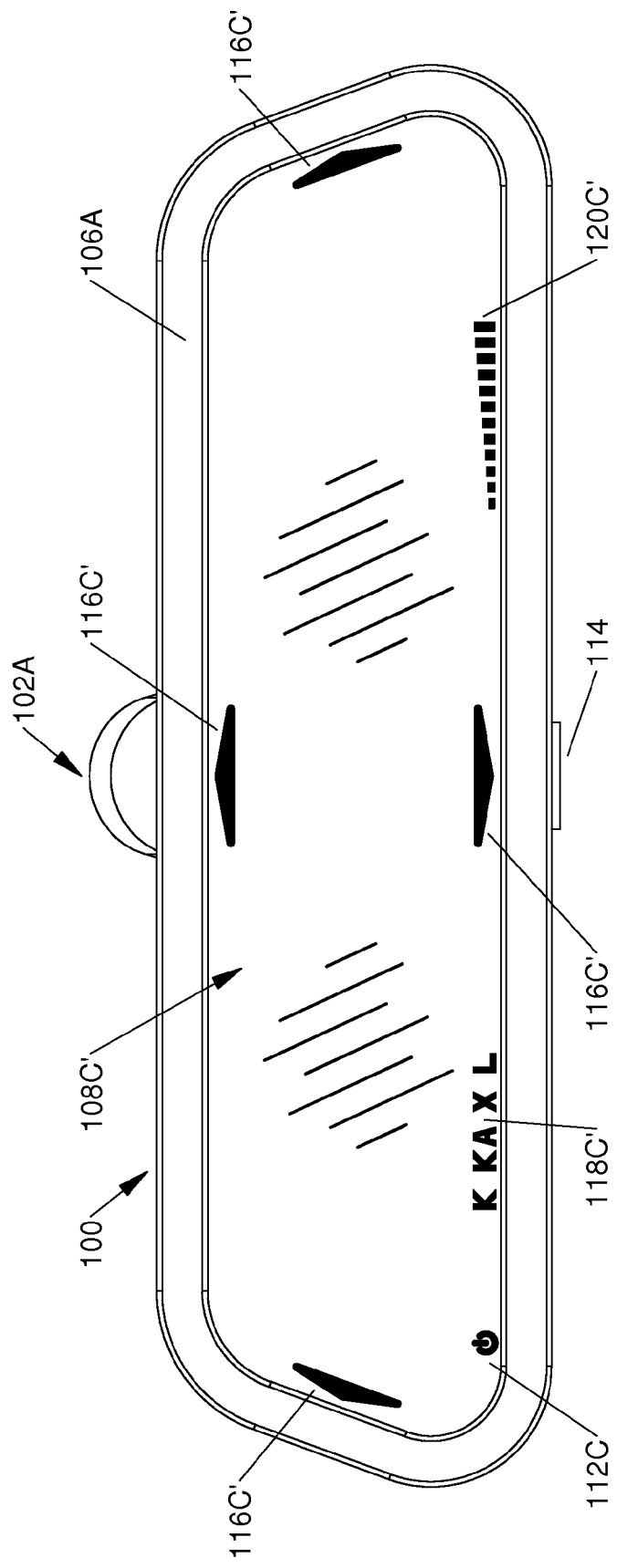
FIG. 8 shows a front view of a rearview mirror assembly with various etched indicators illuminated by LEDs, in accordance with the third embodiment.

FIGS. 7-8—Third Embodiment

The third embodiment is differentiated by the etched indicators of the mirror glass assembly 108C.

FIG. 7 consists of rear view mirror assembly 100 when in standby mode. Also shown are windshield mount assembly 102A, bezel 106A, multi-function push button 114, and mirror glass assembly 108C. Power indicator 112C is illuminated indicating power to the device and standby mode. Directional indicators 116C, signal type indicator 118C, and intensity indicator 120C are visible in mirror glass assembly 108C but are not illuminated.

FIG. 8 consists of rear view mirror assembly 100 with all available indicators illuminated. One example when this occurs is during the startup sequence after the device has been powered. Also shown are windshield mount assembly 102A, bezel 106A, multi-function push button 114, and mirror glass assembly 108C'. Illuminated indicators include power indicator 112C, directional indicators 116C', signal type indicator 118C', and intensity indicator 120C' are visible in mirror glass assembly 108C'.

Figure 9:
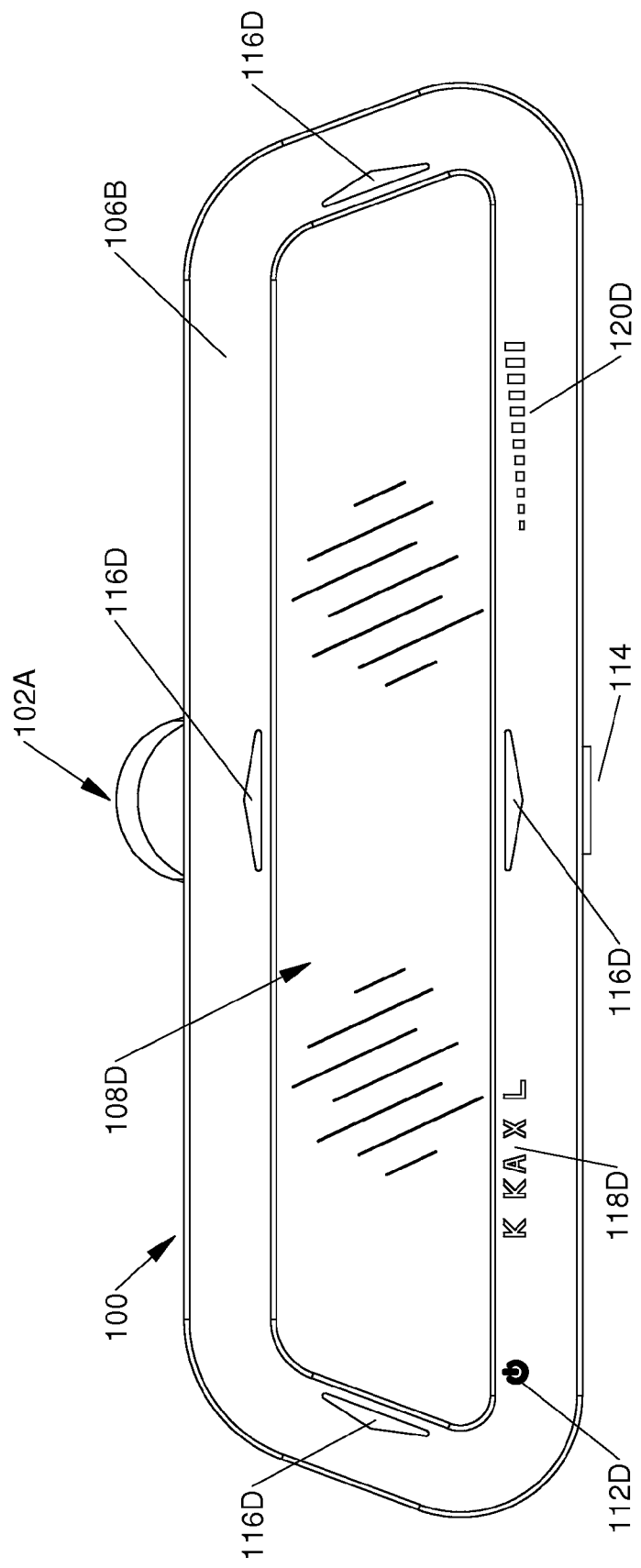
FIG. 9 shows a front view of a rearview mirror assembly in standby mode with a wider bezel, relative to the other embodiments, in accordance with the fourth embodiment.
Figure 10:
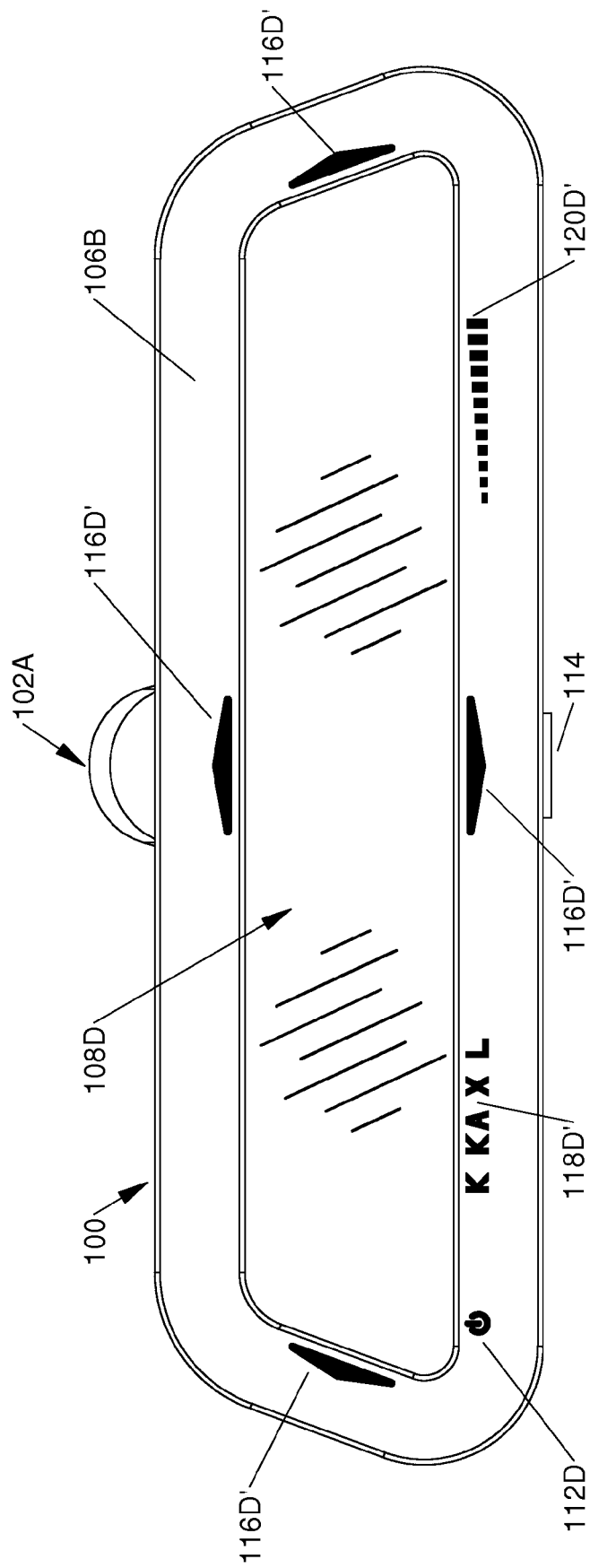
FIG. 10 shows a front view of a rearview mirror assembly with a wider bezel, relative to the other embodiments, with illuminated indicators by LEDs, in accordance with the fourth embodiment.

FIGS. 9-10—Fourth Embodiment

The fourth embodiment is differentiated by the wider bezel (wide bezel 106B).

FIG. 9 consists of rear view mirror assembly 100 when in standby mode. Also shown are windshield mount assembly 102A, wide bezel 106B, multi-function push button 114, and mirror glass assembly 108D. Power indicator 112D is illuminated indicating power to the device and standby mode. Directional indicators 116D, signal type indicator 118D, and intensity indicator 120D are visible in wide bezel 106B but are not illuminated.

FIG. 10 consists of rear view mirror assembly 100 with all available indicators illuminated. This occurs during the startup sequence when the device is being powered on. Also shown are windshield mount assembly 102A, bezel 106B, multi-function push button 114, and mirror glass assembly 108D. Illuminated indicators including power indicator 112D, directional indicators 116D', signal type indicator 118D', and intensity indicator 120D' are visible within wide bezel 106B.

Figure 13A:
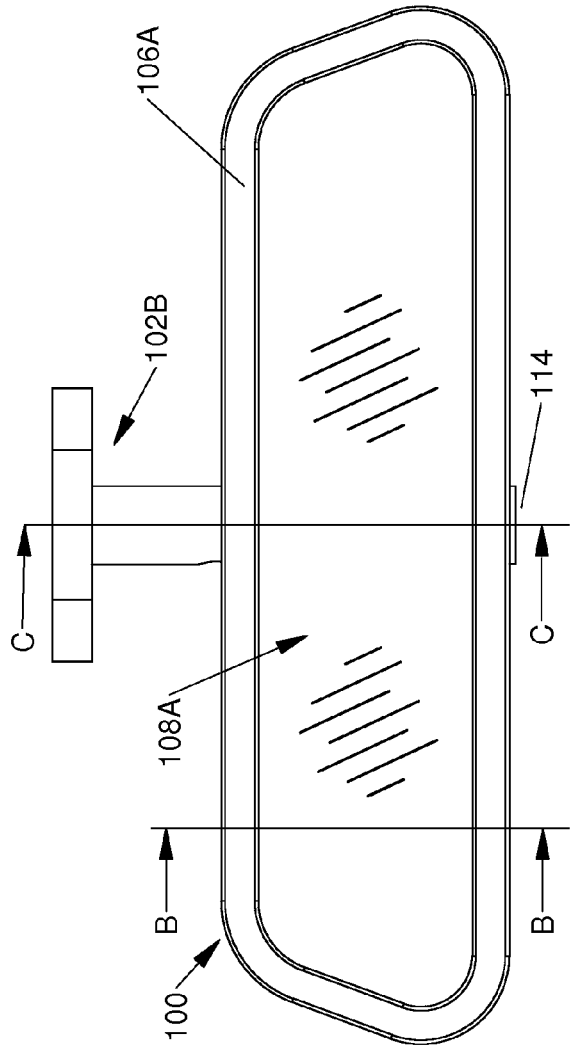
FIG. 13A shows a front view of a rear view mirror assembly with a ceiling mount and location of section lines B-B and C-C, in accordance with a fifth embodiment.
Figure 13C:
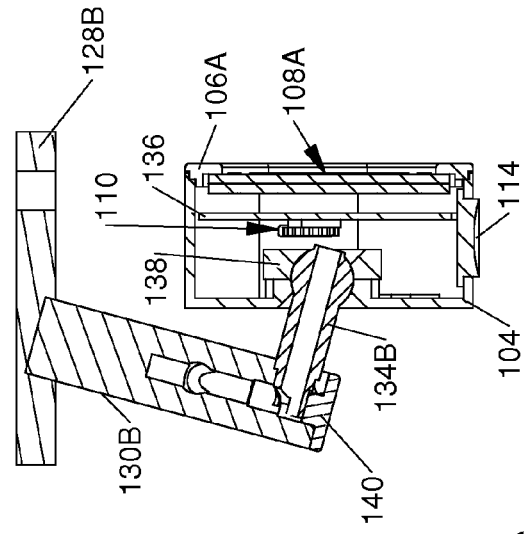
FIG. 13C shows a cross sectional view at line C-C from FIG. 13A, in accordance with a fifth embodiment.
Figure 13B:
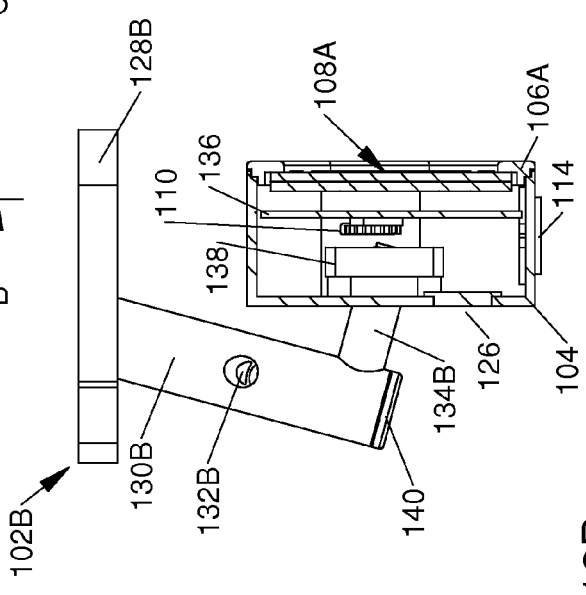
FIG. 13B shows a cross sectional view at line B-B from FIG. 13A, in accordance with a fifth embodiment.
Figure 14:
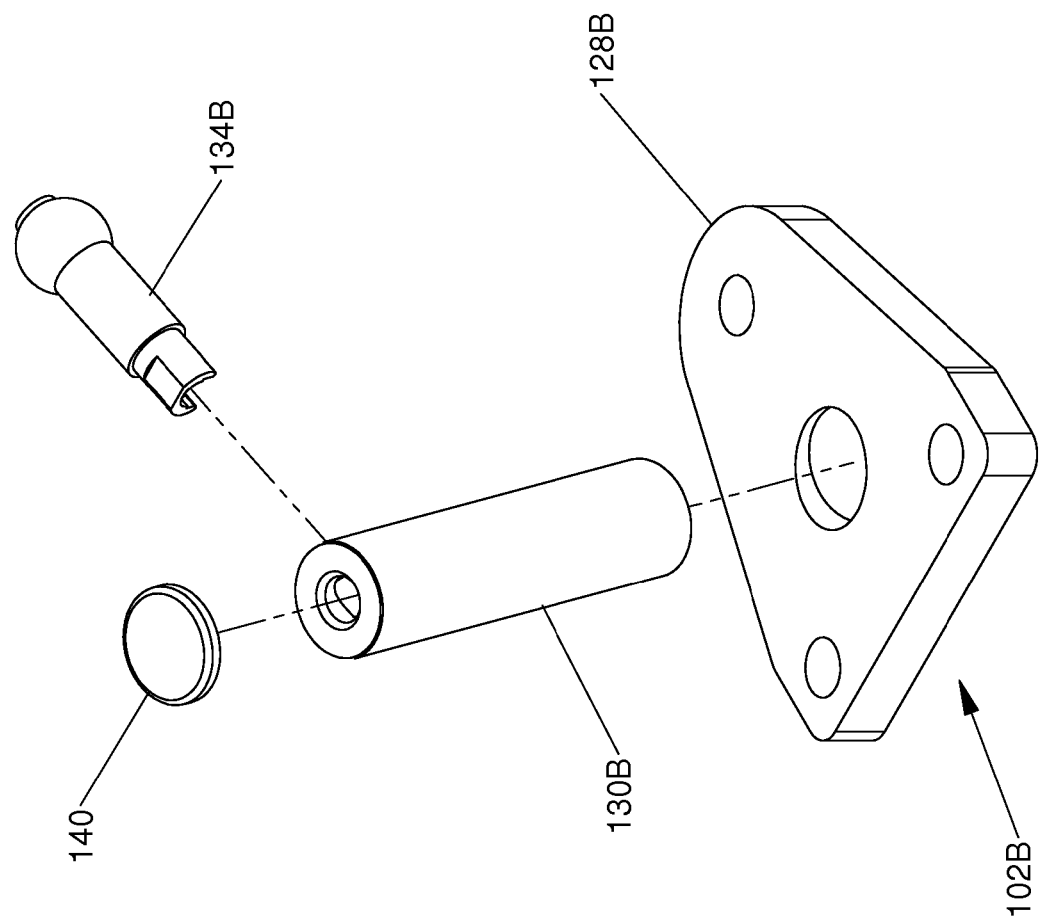
Figure 15:
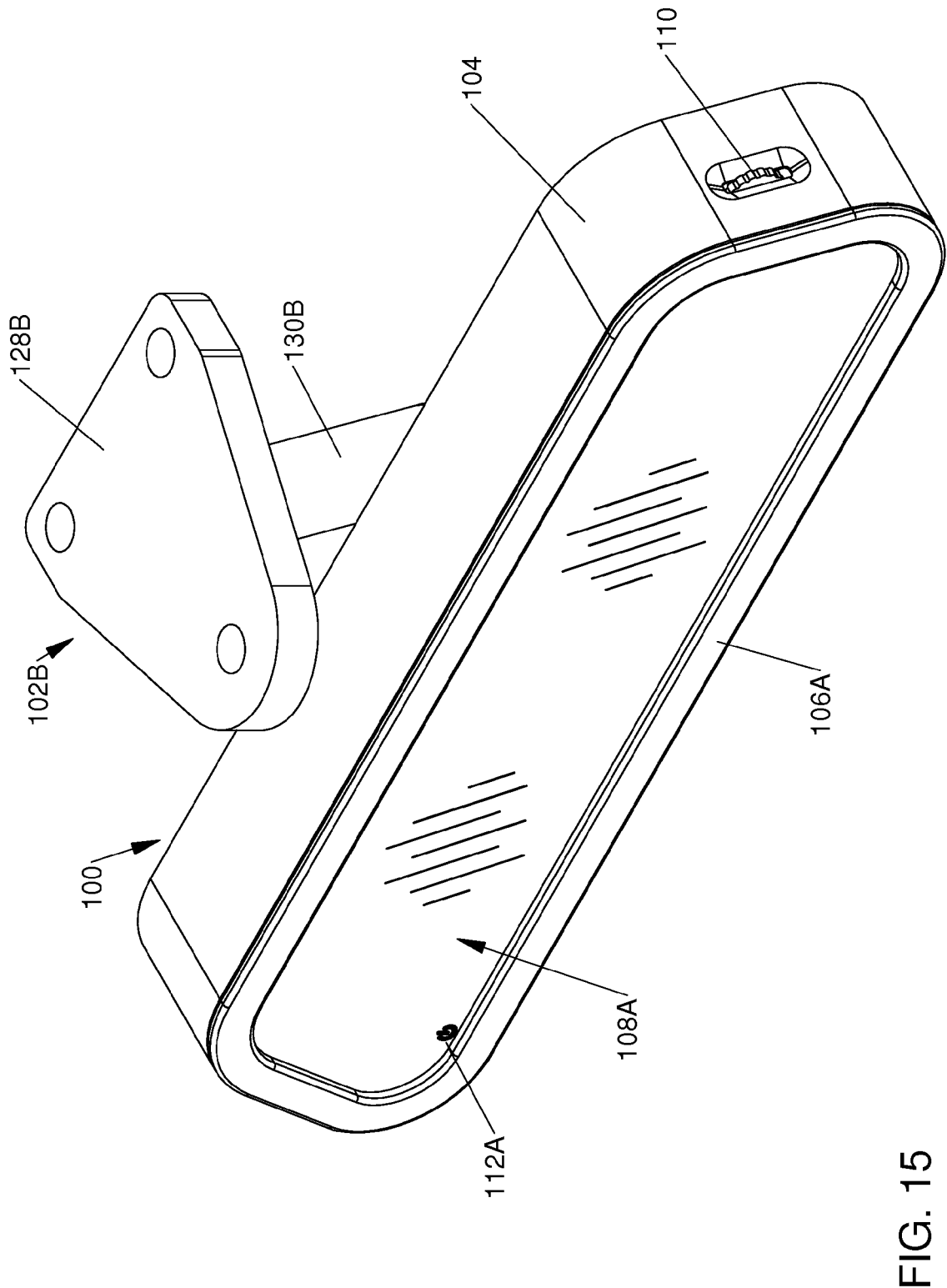
FIG. 15 shows a front perspective view of a rearview mirror assembly with a ceiling mount, in accordance with the fifth embodiment.

FIGS. 13-15—Fifth Embodiment

The fifth embodiment is differentiated by ceiling mount assembly 102B.

FIG. 13A consists of rearview mirror assembly 100 with section lines B-B and C-C, defining the section views shown in FIGS. 13B and 13C.

FIG. 13B is a section view of line B-B, as defined by FIG. 13A. It shows the assembled state of ceiling mount assembly 102B which includes ceiling mount bracket 128B, ceiling mount shaft 130B, cable exit 132B, ceiling mount spherical joint 134B, and ceiling mount shaft endcap 140. Cable exit aperture 132B allows for cables exiting rearview mirror assembly 100 from being pinched during orientation changes or adjustments made by user. The location of cable exit 132B allows for concealment of power cable where the windshield meets the ceiling of the vehicle, preventing the cable from dangling and distracting the driver of the vehicle. Ceiling mount assembly 102B attaches to housing 104 and is fastened by spherical joint bushing 138 vis screws in the present embodiment. Ultrasonic welding, heat-staking, or mechanical snaps are also possible methods to retain ceiling mount assembly 102B into housing 104. Also shown in FIG. 13B are aperture for laser receiver 126, multi-function roller/push button 110, PCB assembly 136, multi-function push button 114, mirror glass assembly 108A, and bezel 106A.

FIG. 13C is a section view line C-C, as defined by FIG. 13A. It shows the assembled state of ceiling mount assembly 102B which includes ceiling mount bracket 128B, ceiling mount shaft 130B, and ceiling mount spherical joint 134B. Ceiling mount bracket 128B is fastened via threads into ceiling mount shaft 130B. Additional methods for attachment include welding, liquid adhesive, press-fitting, etc. Ceiling mount shaft 130B may be fastened to ceiling mount spherical joint 134B via threads. Additional fastening methods may include welding, liquid adhesive, press-fitting, etc. Ceiling mount assembly 102B attaches to housing 104 and is fastened by spherical joint bushing 138 via screws in the present embodiment. Ultrasonic welding, heat-staking, or mechanical snaps are also possible methods to retain windshield mount assembly 102A into housing 104. Also shown in FIG. 13C are multi-function roller/push button 110, PCB assembly 136, multi-function push button 114, mirror glass assembly 108A, and bezel 106A.

FIG. 14 shows an exploded view of ceiling mount assembly 102B which includes ceiling mount bracket 128B, ceiling mount shaft 130B, ceiling mount spherical joint 134B, and ceiling mount shaft endcap 140.

FIG. 15 shows a front perspective view of rearview mirror assembly 100 which includes housing 104 that accommodates the mounting of ceiling mount assembly 102B to affix the rearview mirror assembly 100 onto an interior ceiling of the vehicle. The mirror assembly 100 consists of a housing 104 and a bezel 106A, which supports mirror glass assembly 108A. Mirror assembly 100 accommodates multi-function roller/push button 110 and multi-function push button 114 (not shown in FIG. 15).

Operation

When installed in a vehicle, the first embodiment of the rearview mirror assembly appears, to the casual observer, to have no special features other than the basic reflective nature of a rearview mirror. The only visible difference is a plurality of unobtrusive function buttons shown as multi-function roller/push button 110 and multi-function push button 114 (FIG. 2), although additional buttons, different types of buttons, and different locations of buttons may be used. Multi-function roller/push button 110 and multi-function push button 114 protrude from housing 104, enabling them to be found by a user's tactile response without visual confirmation. To power up the device, the user grabs the mirror assembly the same way they might adjust the angle of a standard rearview mirror—by gripping the mirror assembly 100 between their thumb and four fingers. In this way, their thumb would find the multi-function push button 114. Pressing this button once and releasing, powers the device. This will trigger the device to go through a brief startup sequence, illuminating all indicators available (FIG. 2) and testing the speaker by emitting beeps at the specified volume level. After that, only power indicator 112A remains illuminated to assure the user that the device is still powered. The device is now in standby mode and ready for use.

While the default settings are acceptable for most users, there are several settings that can be customized for the user's preferences. Sliding multi-function roller/push button 110 up and down adjusts the volume level up or down, respectively. Visual feedback is provided to the user by simultaneously displaying the volume changes relative to maximum and minimum volume output via intensity indicator 120A. Auditory feedback is provided to the user by emitted beeps through speaker opening 122 at each volume level the user scrolls through using the rotating feature of multifunction roller/push button 110. Depressing multi-function roller/push button 110 briefly, followed by rotating the button up or down, adjusts the brightness of the illuminated indicators with either increased brightness or decreased brightness, respectively. Once multi-function roller/push button 110 is depressed, all available indicators are illuminated briefly, regardless of mode. As the multi-function roller/push button 110 is rotated up or down, intensity indicator 120A displays the level of brightness currently selected relative to the maximum and minimum brightness available. Additionally, the brightness of the rest of the indicators fluctuates with the multi-function roller/push button 110 as it is rotated by the user. Once the desired brightness is reached, the user presses the button once to set the brightness and exit the brightness setting.

The two main functions of the invention are to provide rearward vision via a mirrored surface and that of a radar and laser detector. When in standby mode, the device can detect radar and/or laser signals via the receivers within the enclosure. When a signal is received, the device enters active mode and various information is communicated to the user with visual and/or auditory indications. In the present embodiment, the indications available for visual feedback include signal type indicator 118A, which designates the type of signal received. For radar signals received, the band of signal is designated via signal type indicator 118A. Directional indicators 116A are available to indicate from what direction the signal is coming. Intensity indicator 120A describes the intensity of the signal received. All of these indicators need not be present in order for the device to function, and additional indicators may be added to show different information related to the radar detector or laser detector. Audible feedback is available for either signal information or for feedback in the settings mode. When a signal is detected, a user may mute the device by pressing multi-function push button 114. Pressing multi-function push button 114 twice in quick succession mutes the sounds as well as dims the display such that directional indicators 116A, signal type indicator 118A, and intensity indicator 120A are no longer visible.

Advantages

From the description above, a number of advantages of my rearview mirror with reader detector and laser detector become evident.

(a) Placing radar detector(s) and laser detector(s) inside of a rearview mirror places the detectors at the optimal location for receiving of radar and laser signals, thus increasing the accuracy of the device over other radar and laser detectors.

(b) Using a rearview mirror as a housing for a radar/laser detector allows for a much wider aperture for the receiver, thus increasing the sensitivity of the device over conventional radar/laser detectors.

(c) Drivers frequently glance at their rearview mirror during normal driving, therefore the presence of visual indicators in this location does not add any distraction. In this first embodiment, the visual indicators are behind the mirror, thus leaving the entire mirrored surface free for normal use of rearward vision.

(d) The device appears like a standard rearview mirror so it does not attract the attention of potential thieves, detract from the aesthetic nature of the vehicle, or distract the driver with dangling cables.

(e) This device allows muscle car owners to utilize the technology of radar and laser detectors in their vehicles that was previously unavailable to them because the standard mounts are not compatible with most muscle cars.

(f) The unit is universal, with a plurality of mounts that can accommodate nearly every vehicle. A user can easily remove one mount and install the other to accommodate the preferred mounting for their vehicle.

Conclusion, Ramifications, and Scope

Accordingly, the reader will see that the embodiments showing the integration of a rearview mirror with a reader and/or laser detector provides the user with an improvement over the currently available solutions.

Furthermore, the rearview mirror assembly has the additional advantages in that:

different materials can be used for the hosing and bezel, for instance a metal housing can be paired with a plastic bezel enabling a robust housing or a plastic housing coupled to a metal bezel.

using other materials can improve the tactile feel of the device or facilitate internal cooling of the electronics a band of indicators can be in a single section and not around the perimeter of the mirror such as a band along the bottom or along the top of the mirror indicators can be distributed among the bezel and the mirror glass assembly a display can be integrated into the bezel to allow for dynamic text to notify the user of more detailed information; dynamically changing information such as the distance to emitting radar or laser signal, etc.

widening the rearview mirror assembly accommodates for a wider aperture for radar receiver, thereby improving the detection of radar signals utilizing different colors of LEDs for specific indicators enables the user to quickly and easily identify different types of information an array of detectors at various angles could be incorporated into the assembly to increase the sensitivity of radar and laser receivers additional mounts are possible for vehicles where the aforementioned mounts are not practical; one such mount may include dashboard mount The mounts can be made in a complementary geometry to any existing vehicle mounts, for after-market installation Although the description contains may specificities, these should not be construed as limiting the scope of the embodiment, but as merely providing illustrations of some of the presently preferred embodiments. For example, the shape of the mirror can have other geometries such as rectangular, oval, circular, etc. Thus, the scope of the embodiment should be determined by the appended claims and their legal equivalents, rather than by the examples given.

The invention claimed is:

1. A rearview mirror assembly, comprising:
   a mirror configured to monitor traffic behind a vehicle;
   a radar or laser detector configured to detect signals received from a radar or laser source; and
   a display surrounding entirety of the mirror, wherein the display includes indicators of directions of the radar or laser source, and wherein the indicators of directions of the radar or laser source include an up arrow, a down arrow, a left arrow, and a right arrow along top, bottom, left, and right edges of the mirror respectively for indicating signals received from front, back, left, and right sides of the vehicle.

2. The rearview mirror assembly of claim 1, wherein the display does not obstruct the use of the mirror for monitoring traffic behind the vehicle, and wherein the display is illuminated when signals are detected from the radar or laser source.

3. The rearview mirror assembly of claim 1, wherein the display does not obstruct the use of the mirror for monitoring traffic behind the vehicle, and wherein the display is not illuminated when no signals are detected from the radar or laser source.

4. The rearview mirror assembly of claim 1 further comprises a universal mount for mounting the rearview mirror assembly to ceiling or windshield of the vehicle.

5. The rearview assembly of claim 1 is made of an opaque housing.

6. The rearview mirror assembly of claim 1, wherein the display further comprises:
   a signal type indicator configured to display a type of signal received by the radar or laser detector, wherein the type of signal received includes at least one of K, KA, X, or L signal.

7. The rearview mirror assembly of claim 1, wherein the display further comprises:
   an intensity indicator configured to display intensity of signals received by the radar or laser detector.

8. The rearview mirror assembly of claim 1, wherein the display further comprises:
   a power indicator configured to indicate whether the radar or laser detector is on or off.

9. The rearview mirror assembly of claim 1 further comprising:
   different color laser emitting diodes (LEDs) for enabling a user to identify different types of information displayed with a quick glance.

10. The rearview mirror assembly of claim 1 further comprising:
    a text display configured to display text information dynamically, including displaying distance to emitting signals from the radar or laser source.

11. A rearview mirror assembly, comprising:
    a mirror configured to monitor traffic behind a vehicle;
    a radar or laser detector configured to detect signals received from a radar or laser source;
    a display surrounding the entirety of the mirror, wherein the display includes indicators of directions of the radar or laser source, and wherein the indicators of directions of the radar or laser source include an up arrow, a down arrow, a left arrow, and a right arrow along top, bottom, left, and right edges of the mirror respectively for indicating signals received from front, back, left, and right sides of the vehicle;
    a speaker configured to provide a sound when signals are detected from the radar or laser source; and
    a multi-function roller button configured to program settings of the radar or laser detector.

12. The rearview mirror assembly of claim 11, wherein the multi-function roller button is configured to adjust volume of the speaker.

13. The rearview mirror assembly of claim 11 further comprising:
    a printed circuit board (PCB) configured to provide detection and notification of radar or laser signals.

14. A rearview mirror assembly, comprising:
    a mirror configured to monitor traffic behind a vehicle;
    a radar or laser detector configured to detect signals received from a radar or laser source;
    a display surrounding the entirety of the mirror, wherein the display includes indicators of directions of the radar or laser source, and wherein the indicators of directions of the radar or laser source include an up arrow, a down arrow, a left arrow, and a right arrow along top, bottom, left, and right edges of the mirror respectively for indicating signals received from front, back, left, and right sides of the vehicle;
    a speaker configured to provide a sound when signals are detected from the radar or laser source; and
    a multi-function push button configured to control mode of operation of the radar or laser detector.

15. The rearview mirror assembly of claim 14, wherein the multi-function push button is configured to mute the sound of the radar or laser detector when pressed once.

16. The rearview mirror assembly of claim 14, wherein the multi-function push button is configured to mute the sound and to dim the display of the radar or laster detector when pressed twice successively.

* * * * *